May 7, 1935. E. H. KREMER 2,000,598
BELT CONNECTER
Filed Jan. 17, 1934   2 Sheets-Sheet 1
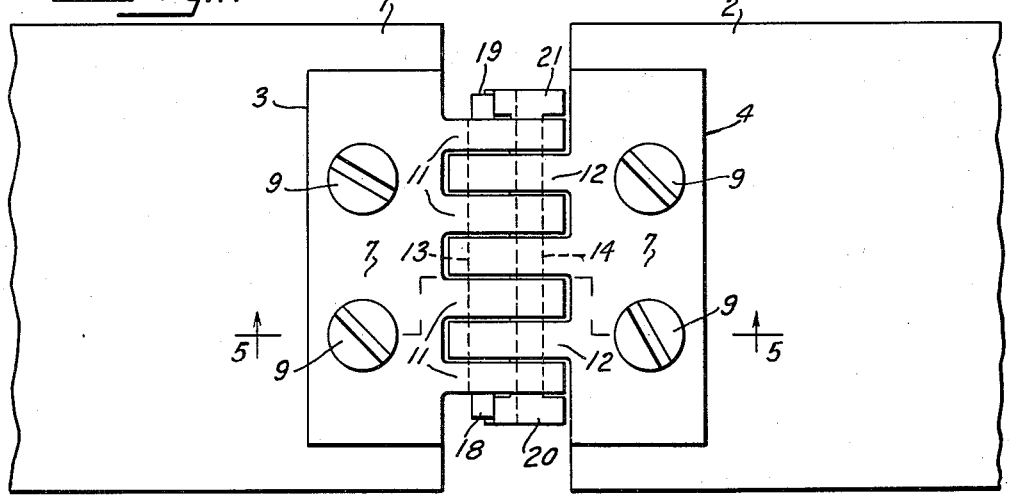
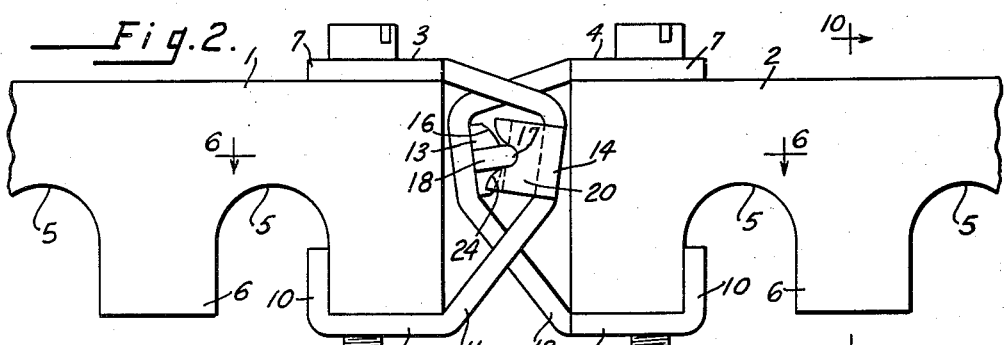
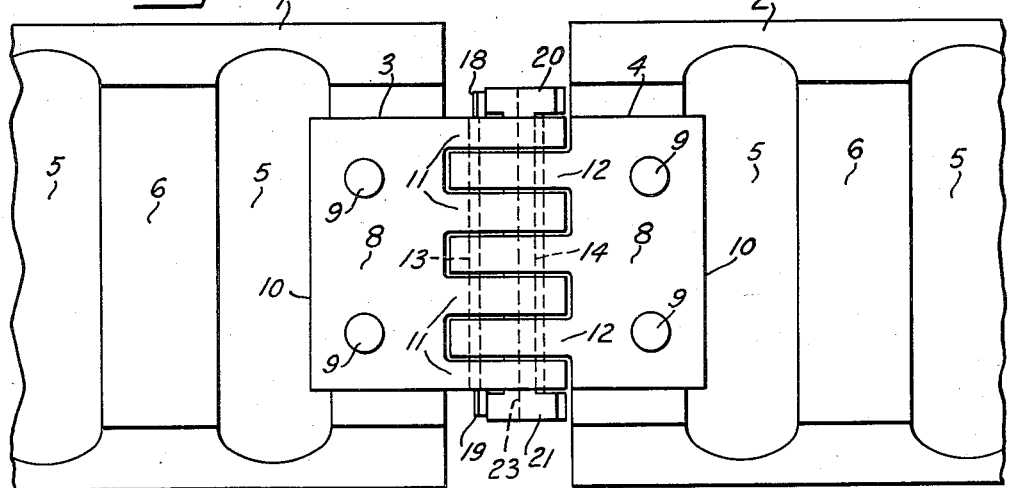
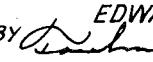

May 7, 1935.  E. H. KREMER  2,000,598
BELT CONNECTER
Filed Jan. 17, 1934  2 Sheets-Sheet 2
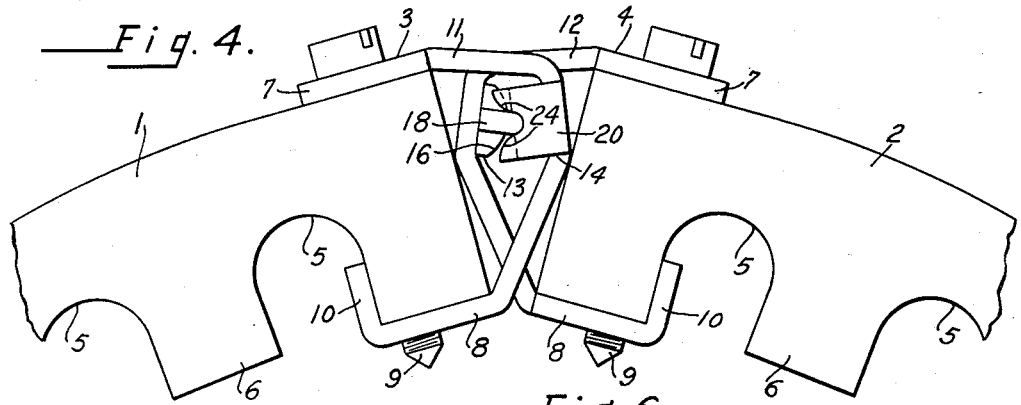
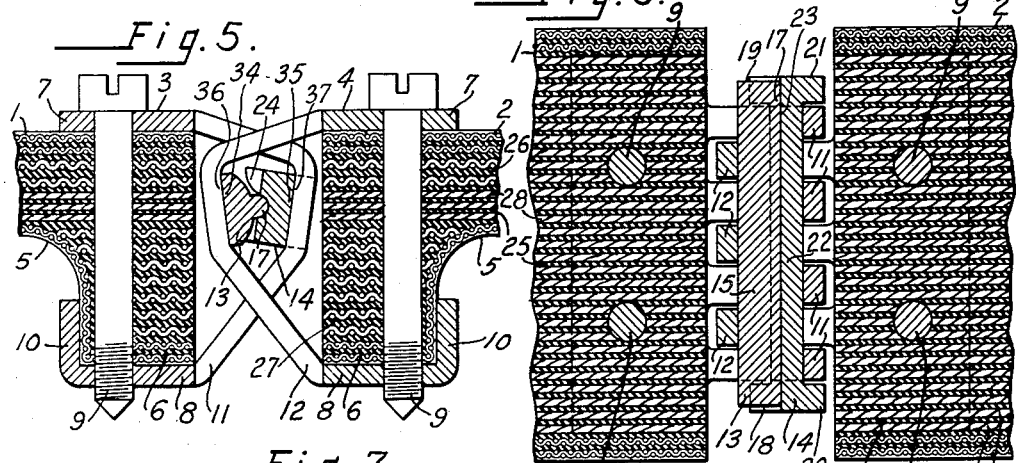
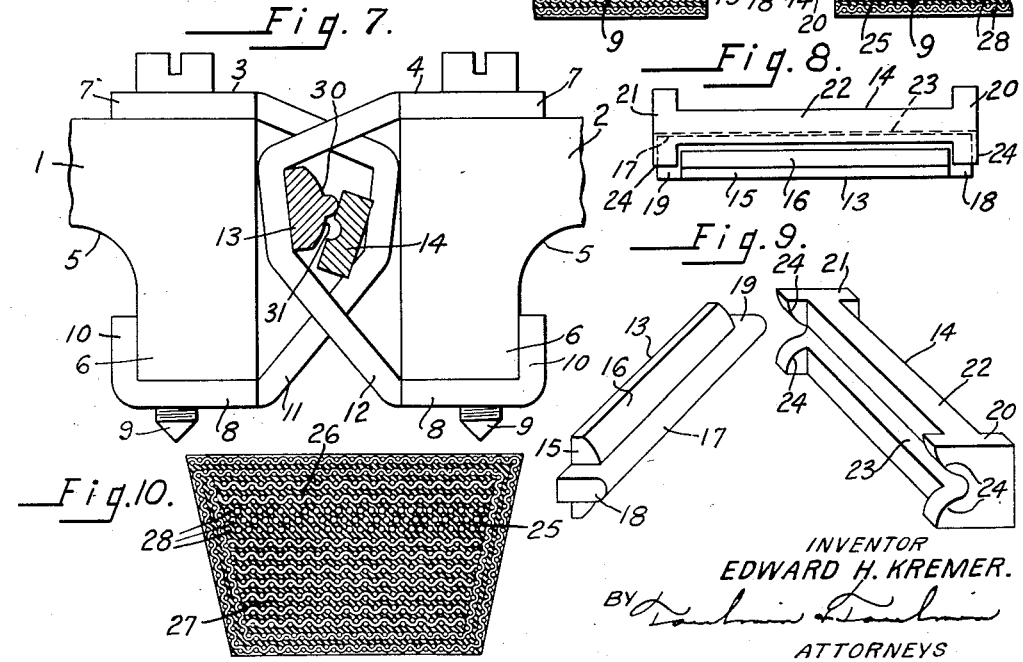
INVENTOR
EDWARD H. KREMER.
BY
ATTORNEYS Patented May 7, 1935

2,000,598

UNITED STATES PATENT OFFICE 2,000,598

BELT CONNECTER

Edward H. Kremer, Dayton, Ohio, assignor to The Dayton Rubber Manufacturing Company, Dayton, Ohio, a corporation of Ohio Application January 17, 1934, Serial No. 706,977

18 Claims. (Cl. 24—33)

This invention relates to belt connecters and, in particular, to belt connecters having inter-penetrating members and pintle members held thereby.

The problem faced by the applicant in making his invention was to provide a belt connecter of the above type, which would have means to prevent the rapid wear of the oppositely-engaging surfaces of the pintle members, and at the same time prevent the dislocation or displacement of the pintle members, such as is called "cocking".

One object of my invention is to provide a belt connecter with inter-penetrating clamping members and pintle members supported thereby, one of which pintle members has provision for preventing its dislodgment from its proper engagement with the other pintle.

Another object is to provide such a belt connecter and pintle members wherein one of the pintle members has laterally extended shoulders which engage a corresponding groove in the opposite pintle member.

Another object is to provide a belt connecter of the type above described, wherein the pintle members have flat backs engaging correspondingly flattened portions on the clamping members.

Another object is to provide such a belt connecter having pintle members, one having a groove and flanged heads, and the other having a ridge deeper than the groove and an arcuate face, the ridge being extended beyond its body portion and engaging a groove in the flanged heads of the other pintle member, thereby decreasing wear of the opposing surfaces, preventing engagement other than between the ridge and groove, and preventing dislodgment or "cocking" of the parts.

Another object is to provide such a belt connecter wherein the clamping portions engage the ends of a belt made of alternate layers of fabric and rubber, the belt being flexible transversely in the plane of its pulleys, and longitudinally inextensible along its neutral axis yet extensible along its outer portion and compressible along its inner portion.

In the drawings:

Figure 1 is a top plan view of my belt connecter, in position to interconnect the ends of a belt.

Figure 2 is a side elevation of the belt connecter and belt ends shown in Figure 1.

Figure 3 is a bottom plan view of the belt connecter in Figures 1 and 2.

Figure 4 is a side elevation of the belt connecter of my invention, showing its operation when the oppositely-connected belt portions are passing around a pulley of small diameter, or are otherwise at an angle to one another.

Figure 5 is a vertical section along the line 5—5 of Figure 1.

Figure 6 is a horizontal section along the line 6—6 of Figure 2.

Figure 7 is a vertical section similar to Figure 5, but with pintle members of ordinary construction, showing the dislocation thereof, which my invention prevents.

Figure 8 is a top plan view of the two inter-engaging pintle members alone, in their engaged position.

Figure 9 is a perspective view of the two pintle members separated.

Figure 10 is a cross section through the belt along the line 10—10 of Figure 2.

Referring to the drawings in detail, Figure 1 shows the ends 1 and 2 of a belt of rubber and fabric construction as joined by opposite clamping members, generally designated 3 and 4. The belt portions 1 and 2 are shown as having cut-away portions 5, thereby providing tooth-like portions 6 which more readily permit the inner surface of the belt to become of shorter length than the outer surface, as is necessary in passing around pulleys of small diameter. It is understood, however, that the cut-away portions 5 and teeth 6 are optional, and that the connecter of my invention may equally well be applied to belts without such cut-away portions.

The clamp members 3 and 4 of the belt connecter are bent roughly in a C shape, the upper and lower portions 7 and 8 of which are bent toward one another in approximately parallel positions, and held together against the opposite sides of the belt by the clamp screws 9. Where the belt possesses the cut-away portions 5, the ends 8 of the clamp portions 3 and 4 may be bent around as at 10 to provide a firmer grip on the belt (Figure 2).

The opposite clamp portions 3 and 4 are provided with a plurality of inter-penetrating portions 11 and 12 respectively, these being so arranged as to inter-lace with one another and yet provide a space between one another for the reception of the pintle members 13 and 14. The latter are held in engagement with one another by the pull on the opposite ends 1 and 2 of the belt and provide a bearing arrangement between the oppositely-disposed and interlaced clamp members 11 and 12.

The pintle members 13 and 14 are elongated bodies (Figure 9) of opposite construction. The male pintle member 13 has a body portion 15, preferably provided with an arcuate surface 16, and a rib 17 extending therealong. The rib 17 is extended beyond each end of the body portion 15 as at 18 and 19. The female pintle member 14 is provided with flanged heads 20 and 21 extending beyond its body portion 22, both being provided with a groove 23 running therealong from one end to the other. The heads 20 and 21 are cut away on either side of the groove 23, as at 24, to provide for free rocking of the extended end portions 18 and 19 of the male pintle member 13. The ridge 17 is deeper than its groove 23.

The belt itself (Figure 10) is preferably of rubber and fabric construction, so formed that it has transverse flexibility in the plane of its pulleys without having longitudinal extensibility in its neutral axis 25. At the same time its outer portion 26 is of such construction and its fabric so arranged as to provide a certain amount of longitudinal extensibility without a corresponding lateral expansion or contraction. The inner portion 27, on the other hand, is of a different construction, providing longitudinal compressibility without a lateral extension or contraction. By this construction, the neutral axis 25 remains of substantially constant length, whereas the upper portion may be expanded longitudinally and the lower portion may be contratced longitudinally in passing around pulleys. The neutral axis 25 contains a plurality of cords 28 imbedded therein, these cords being tightly twisted and thus substantially inextensible longitudinally.

In operation, the clamping members 3 and 4 are inter-engaged with their tooth-like portions 11 and 12 passing one another in the interstices therebetween (Figure 1). The pintle members 13 and 14 are then placed therebetween with the ridge 17 of one in engagement with the groove 23 of the other, yet with the body portion 15 of the male member held between the end flanges 20 and 21 of the female pintle member. The ends 1 and 2 of the belt are now inserted within the clamping members 3 and 4 (Figures 2 and 4) and secured in position by the clamping screws 9.

As the belt ends change position from that shown in Figure 2, as in a straight run, to that shown in Figure 4, as in passing around a small pulley, the male pintle portion 13 will rock in the female pintle portion 14. These two pintle members will be prevented from dislodgment by the end portions 18 and 19 of the ridge 17 engaging the groove 23 as it passes through the flanged heads 20 and 21 and by the projection of the latter at the cut-away portions 24. At the same time, the flanged heads engage one of the clamping members and also the body portion 15 of the male pintle member 13, preventing both from moving endwise.

In this manner the dislodgment or "cocking" of the two pintle members, as occurring in ordinary types (Figure 7) is thereby prevented. Without the means for holding the opposite pintle members 13 and 14 in engagement with one another, this dislocation frequently occurs, and often results in a breaking of the clamp and a consequent disruption in the service of the machine to which it is applied. At the same time, the ordinary pintle members are subject to serious wear on their arcuate portions especially at the points 30 and 31. This wear is largely reduced by my provision of the specially formed pintle members of my invention, since the greater depth of the ridge 17 than the groove 23 will keep the arcuate pintle face 16 from touching the opposite face of the other pintle portion 14 during the rocking thereof. The flat backs 34 and 35 of the pintle members 13 and 14 will engage the flattened portions 36 and 37 of the clamping member tongues 11 and 12, further tending to keep the pintle members 13 and 14 in engagement.

It will be understood that I desire to comprehend within my invention such modifications as may be necessary to adapt it to varying conditions and uses.

Having thus fully described my invention, what I claim as new and desire to secure by Letters Patent is:

1. A belt connecter comprising interlaced clamping members having pintle members arranged therebetween, one of said pintle members having a groove, the other pintle member having a rib engaging said groove, said rib extending beyond the body of its pintle member.

2. A belt connecter comprising interlaced clamping members having pintle members arranged therebetween, one of said pintle members having a groove and flanged heads, the other pintle member having a rib engaging said groove, said rib extending beyond the body of its pintle member.

3. A belt connecter comprising interlaced clamping members having pintle members arranged therebetween, one of said pintle members having a groove and flanged heads, the other pintle member having a rib engaging said groove, said rib extending beyond the body of its pintle member and engaging grooves in said flanged heads.

4. A belt connecter comprising interlaced clamping members having pintle members arranged therebetween, said pintle members having inter-engaging male and female portions, one of said portions having flanged ends adapted to prevent sidewise motion of the other portion, said other portion having extended projections engaging grooves in said flanged ends.

5. A belt connecter comprising interlaced clamping members having pintle members arranged therebetween, said pintle members having inter-engaging male and female portions, one of said portions having flanged ends adapted to prevent sidewise motion of the other portion, said other portion having extended projections engaging grooves in said flanged ends, the body of the unflanged member being held between the flanges of the flanged member, whereby the inter-engaging portions may rock without dislodgment or sidewise motion.

6. A belt connecter comprising interlaced clamping members having pintle members arranged therebetween, said pintle members having inter-engaging male and female portions, and means for preventing the dislodgment of said portions from inter-engagement with one another, each of said clamping members having portions facing one another and adapted to hold the end of a belt therebetween.

7. A belt assembly comprising a belt which is substantially longitudinally inextensible along its neutral axis yet relatively flexible in its own plane when its ends are connected; and a belt connecter comprising interlaced clamping members secured to the ends of said belt and having inter-engaging pintle members with male and female portions, one of said portions having flanged ends adapted to prevent sidewise motion of the other portion, said other portion having extended projections engaging grooves in said flanged ends.

8. A belt assembly comprising a belt which is substantially longitudinally inextensible along its neutral axis yet relatively flexible in its own plane when its ends are connected; and a belt connecter comprising interlaced clamping members secured to the ends of said belt and having inter-engaging pintle members with male and female portions, one of said portions having flanged ends adapted to prevent sidewise motion of the other portion, said other portion having extended projections engaging grooves in said flanged ends, the body of the unflanged member being held between the flanges of the flanged member, whereby the inter-engaging portions may rock without dislodgment or sidewise motion.

9. A pintle assembly for a belt connecter comprising a pair of inter-engaging pintle members, one of said members having a groove, the other having a rib engaging said groove, said rib extending beyond the body of its member.

10. A pintle assembly for a belt connecter comprising a pair of inter-engaging pintle members, one of said members having a groove, the other having a rib engaging said groove, said rib extending beyond the body of its member and engaging grooved end flanges in said grooved pintle member.

11. A pintle member for a belt connecter comprising a body portion having a rib, said rib being extended beyond the ends of said body portion.

12. A pintle assembly for a belt connecter comprising a pair of inter-engaging pintle members with flat backs, one of said members having a groove, the other having a rib of greater depth than said groove engaging it, said rib extending laterally beyond the body of its pintle member.

13. A pintle assembly for a belt connecter comprising a pair of inter-engaging pintle members with flat backs, one of said members having a groove, the other having a rib of greater depth than said groove engaging it, said rib extending laterally beyond the body of its pintle member, one of said pintle members having an arcuate face.

14. A pintle assembly for a belt connecter comprising a pair of inter-engaging pintle members, one of said members having a groove, the other having an arcuate surface with rib therealong adapted to engage said groove, said rib being deeper than said groove and extending laterally beyond the body of its pintle member.

15. A pintle assembly for a belt connecter comprising a pair of inter-engaging pintle members with flat backs, one of said members having a groove, the other having a rib of greater depth than said groove engaging it, said rib extending laterally beyond the body of its pintle member, said end flanges being cut away to provide projections adapted to prevent dislodgment of said rib from said groove.

16. A belt connecter comprising interlaced clamping members with flattened portions, and pintle members arranged therebetween having flat backs engaging said flattened portions, one of said pintle members having a groove and flanged heads, the other pintle member having a rib engaging said groove, said rib being deeper than said groove and extending laterally beyond the body of its pintle member.

17. A belt assembly comprising a belt having cut-away portions therein, and a belt connecter comprising interlaced clamping members secured to the ends of said belt and having inter-engaging pintle members, said clamping members having end portions adapted to hold the maximum thickness of the belt therebetween, one of said pintle portions having flanged ends adapted to prevent sidewise motion of the other portion, said other portion having extended projections engaging grooves in said flanged ends.

18. A belt connecter comprising interlaced clamping members having inter-engaging pintle members arranged therebetween, one of said pintle members having flanged ends adapted to prevent endwise motion thereof relative to said clamping members and also to prevent endwise motion of the other pintle member relative to said flanged pintle member, said other portion having extended projections engaging grooves in said flanged ends.

EDWARD H. KREMER.